United States Patent
Otaka et al.

[11] Patent Number: 5,985,152
[45] Date of Patent: Nov. 16, 1999

[54] METHOD OF PREVENTING CORROSION IN A WATER SYSTEM

[75] Inventors: Hideo Otaka; Nobuhiro Matsushita, both of Tokyo, Japan

[73] Assignee: Kurita Water Industries Ltd., Tokyo, Japan

[21] Appl. No.: 09/000,840

[22] Filed: Dec. 30, 1997

[30] Foreign Application Priority Data

Jan. 9, 1997 [JP] Japan .................................. 9-002218

[51] Int. Cl.$^6$ ....................................................... C02F 1/42
[52] U.S. Cl. ................ 210/668; 210/670; 210/683; 210/687; 210/698; 210/701; 422/14; 422/17; 422/18
[58] Field of Search .................... 210/663, 668, 210/669, 683, 685, 687, 698–701, 670; 422/14, 17, 18, 15, 16

[56] References Cited

U.S. PATENT DOCUMENTS

| | | | |
|---|---|---|---|
| 3,444,079 | 5/1969 | Bowers | 210/259 |
| 3,458,438 | 7/1969 | Smith et al. | 210/188 |
| 3,805,880 | 4/1974 | Lawlar | 165/1 |
| 4,432,878 | 2/1984 | Emshoff et al. | 210/662 |
| 4,481,112 | 11/1984 | Hitzel | 210/620 |
| 4,532,045 | 7/1985 | Littmann | 210/668 |
| 4,564,455 | 1/1986 | Flynn et al. | 210/675 |
| 4,820,421 | 4/1989 | Auerswald | 210/670 |
| 4,917,806 | 4/1990 | Matsunaga et al. | 210/662 |
| 4,931,187 | 6/1990 | Derham et al. | 210/662 |
| 5,820,763 | 10/1998 | Fujita et al. | 210/663 |

FOREIGN PATENT DOCUMENTS

| | | |
|---|---|---|
| 87-124992 | 3/1987 | Japan . |
| 6-158364 | 6/1994 | Japan . |
| 7-316852 | 12/1995 | Japan . |
| 96-056537 | 12/1995 | Japan . |
| 9-176872 | 7/1997 | Japan . |
| 97-400061 | 7/1997 | Japan . |
| 97-419808 | 7/1997 | Japan . |

*Primary Examiner*—Peter A. Hruskoci
*Attorney, Agent, or Firm*—Kanesaka & Takeuchi

[57] ABSTRACT

Ca ion is removed by a cation exchange resin and silica and corrosive ions are removed by an anion exchange resin. Even after the anion exchange resin reaches the silica break through point or after the cation exchange resin reaches the Ca ion break through point, the supply of water is continued until the average of silica concentration or Ca ion concentration reaches a predetermined value. By supplying both treated water before the break through point and treated water after the break through point, water containing silica or Ca ion of suitable concentration can be supplied to the water system with only one anion exchange column or cation exchange column.

18 Claims, 4 Drawing Sheets

METHOD OF PREVENTING CORROSION IN A WATER SYSTEM

FIELD OF THE INVENTION AND RELATED ART

The present invention relates to a method of preventing corrosion in a water system and, more particularly, to a method of efficiently preventing corrosion in metal including carbon steel, stainless steel, copper, and copper alloy in the water system, and yet preventing formation of scales of a silica group and scales of a calcium carbonate group, by removing corrosive ions while anticorrosive ions in a suitable concentration are kept by ion exchange treatment of feedwater or holding water for the water system.

Carbon steel, stainless steel, copper, and copper alloy are employed as base materials of various equipment and piping used in a fresh water system such as an open or closed cooling water system, a heat storage water system, and a closed cooling/heating water system. These materials which are used in immersed state in the fresh water corrode because of chloride ion ($Cl^-$), sulphate ion ($SO_4^{2-}$), or the like brought by the feedwater so that pitting corrosion builds up. Under this circumstances, as one of conventional methods of preventing such corrosion of metal materials contacting with fresh water in such a fresh water system, a method including steps of bringing water of the water system in contact with anion exchange resin with anticorrosive anions and of adding low molecular weight polymer in the water has been proposed (Japanese Unexamined Patent Publication No. H06-158364).

In this method, the anion exchange treatment is performed by bringing corrosive ions such as $Cl^-$ and $SO_4^{2-}$ in the water in contact with the anion exchange resin with the anticorrosive anions such as $OH^-$, $HCO_3^-$, thereby reducing the concentration of the corrosive ions in the water and thus weakening the corrosiveness of the water system. In addition, since the low molecular weight polymer has a function of facilitating film formation, for example, $HCO_3^-$ flowing out by the anion exchange and $Ca^{2+}$ arising from the water system form a corrosion preventive film on a metal surface, thereby further reliably preventing the corrosion of the metals.

In such corrosion preventive treatment of the water system, in order to employ an $OH^-$-form weak basic anion exchange resin or a $CO_3^{2-}$-form strong basic anion exchange resin which are easy to regenerate as anion exchange resins, a method of bringing water in contact with the anion exchange resin after adjusting pH of the feedwater to the water system or the holding water drawn from the water system not in excess of 5 has been also proposed (Japanese Unexamined Patent Publication No. H07-316852).

Ca ions and silica are desired to be contained in the water system in a suitable amount, since the Ca ions and silica function as anticorrosive ions for forming the corrosion preventive film and adversely function as scale forming components.

For example, silica is preferably adjusted to be within a range between 30 and 150 mg/l. in a cooling water system or the like (however, the upper limit in case of using scale inhibitors for scales of a silica group is 400 mg/l.). When the silica concentration is less than 30 mg/l., the silica component is not enough to form the corrosion preventive film so as to deteriorate the anticorrosive behavior. When the silica concentration is too high, scales of a silica group primarily including magnesium silicate are adversely formed causing scale problems, while the anticorrosive behavior is improved. Therefore, the silica concentration should be 30 mg/l. (=150/5) or less in a cooling water system with a concentration of 5 times.

Japanese Unexamined Patent Publication No. H09-176872 discloses a method of removing the corrosive ions such as $Cl^-$ and $SO_4^{2-}$ by anion exchange resins, wherein the silica concentration in a water system is controlled by supplying treating water including two kinds of anion exchange resins into the water system at a suitable rate. One of the anion exchange resins is a $HCO_3$-form anion exchange resin having the capability to remove corrosive ions but having no capability to remove silica, and the other is an $OH^-$-form strong basic anion exchange resin having the capability to remove corrosive ions and the silica. This method is performed, concretely, by arranging in parallel an anion exchange column for the $HCO_3$-form anion exchange resin and an anion exchange column for the OH-form strong basic anion exchange resin and controlling flow ratio into the respective columns.

Since Ca ion is effective to form the corrosion preventive film, higher Ca ion concentration is better in view of the corrosion prevention. When the Ca ion concentration is too high, however, scales of a calcium group are formed causing scale problems.

Accordingly, the Ca ion concentration should be adjusted within such a range that no scales are formed in a condition of supersaturation of calcium salt, for example, calcium carbonate. It should be noted that it is difficult to sweepingly set the upper limit of the Ca ion concentration because the degree of supersaturation depends on the M-alkalinity, the presence of scale inhibitors, the kind and amount of the scale inhibitors in the water system. Therefore, the guide of Ca ion concentration may be set for each related water system.

For removing the Ca ion, Japanese Unexamined Patent Publication No. H07-316852 includes the description that cation exchange resin is preferably used as a means of adjusting pH not in excess of 5 because it can also remove M-alkali components.

The methods disclosed in Japanese Unexamined Patent Publication Nos. H06-158364 and H07-316852 are not given consideration for keeping the silica concentration in the water system in a suitable value. Therefore, there is a possibility of the shortage of silica for forming the corrosion preventive film.

The method disclosed in Japanese Unexamined Patent Publication No. H09-176872 can keep the silica concentration in the water system in a suitable value. However, this method requires the installation of two anion exchange columns (two anion exchange beds), which makes the equipment larger, takes a lot of time for regeneration, and increases the amount of agent and the displacement.

In case of using the cation exchange resin to remove Ca ion so as to maintain the Ca ion concentration in the water system to be a suitable value, also, it is necessary to provide bypass piping or the like to adjust the ratio of water passing through a cation exchange column and water not passing through the cation exchange column, thereby making the equipment and the operation complex.

That is, to perform the removal of the corrosive ion and the partial removal of silica and Ca ion by using the conventional methods, two anion exchange columns 2a, 2b, one cation exchange column 1a, and bypass piping 1b are required as shown in FIG. 4.

It is an object of the present invention to solve the conventional problems as mentioned above and to provide a method of preventing corrosion in a water system which allows smaller equipment for ion exchange treatment, reduction in time for regeneration, the amount of agent and the displacement. The method comprises removing corrosive ions from feedwater or holding water of the water system by ion exchange treatment to reduce the corrosiveness of the water system, and removing silica and/or Ca ion to control the silica and/or Ca ion concentrations in the water system to be in suitable values, thereby preventing the scale problems and improving the anticorrosive behavior of the water system.

SUMMARY OF THE INVENTION

A method of preventing corrosion in a water system of the first aspect, in which water to be supplied to the water system or water drawn from the water system is brought in contact with an OH-form strong basic anion exchange resin to remove corrosive ions and then is supplied to the water system, resides in that the water brought in contact with the anion exchange resin is still continued to be supplied into the water system even after the anion exchange resin reaches the silica break through point, until the silica concentration of the water reaches a predetermined value.

A method of preventing corrosion in a water system of the second aspect, in which water to be supplied to the water system or water drawn from the water system is brought in contact with a cation exchange resin and then brought in contact with an anion exchange resin to remove corrosive ions and, after that, is supplied to the water system, resides in that the water brought in contact with the cation exchange resin is still continued to be brought in contact with the anion exchange resin even after the cation exchange resin reaches the Ca ion break through point, until the Ca ion concentration of the water reaches a predetermined value.

A method of preventing corrosion in a water system of the third aspect, in which water to be supplied to the water system or water drawn from the water system is brought in contact with a cation exchange resin and then brought in contact with an OH-form strong basic anion exchange resin to remove corrosive ions and, after that, is supplied to the water system, is characterized in that even after the anion exchange resin reaches the silica break through point, until the silica concentration of the water reaches a predetermined value, the supply of the water brought in contact with the anion exchange resin into the water system is still continued, and even after the cation exchange resin reaches the Ca ion break through point, until the Ca ion concentration of the water reaches a predetermined value, the supply of the water brought in contact with the cation exchange resin to the anion exchange resin is still continued.

In removing the corrosive ions and silica by the anion exchange resin, an anion exchange column filled with OH-form strong basic anion exchange resin having the capability to exchange ions of silica is used. In this case, as shown in FIG. 3a, the silica concentration and Cl$^-$ ion concentration are low after the regeneration of the anion exchange resin and at the early stage of the demineralization, since silica and the corrosive ions such as Cl$^-$ ion are caught by the anion exchange resin due to the anion exchange reaction. However, once the anion exchange resin exceeds the ion exchange capacity by continuing the demineralization, the silica flows out. This point is referred to as "silica break through point". Since the corrosive ions such as Cl$^-$ ion and SO$_4^{2-}$ ion are more difficult to flow out than the silica, the concentration of such corrosive ions in the water being treated is low. The amount of softened water which reaches the break through point of Cl$^-$ ion is 1.5 times of that of the softened water which reaches the break through point of silica. In the present invention, the water between the Cl$^-$ ion break through point and the silica break through point can be supplied to the water system.

In the method of the first aspect, until the flowing out of the corrosive ions is started and the average of the silica concentration (shown by a break line in FIG. 3a) of the total amount of treated water of the anion exchange column after the immediately proceeding regeneration reaches the threshold, the water treated by the anion exchange in which the silica flows out is supplied to the water system even after the silica break through point. This allows water containing no corrosive ions and containing silica of suitable concentration to be supplied to the water system with only one anion exchange column and allows the silica concentration in the water system to be held in suitable value, thereby preventing the scale problems and improving the anticorrosive behavior of the water system.

In the same manner, also in case of removing Ca ion by the cation exchange resin, as shown in FIG. 3b, the calcium hardness is low after the regeneration of the cation exchange resin and at the early stage of the demineralization, since Ca ion is caught by the cation exchange resin due to the cation exchange reaction. However, once the cation exchange resin exceeds the ion exchange capacity by continuing the demineralization, the Ca ion flows out. This point is referred to as "Ca ion break through point".

In the method of the second aspect, until the average of the calcium hardness (shown by a break line in FIG. 3b) of the total amount of treated water of the cation exchange column after the immediately proceeding regeneration reaches the threshold, the water treated by the cation exchange in which the Ca ion flows out is supplied to the water system even after the Ca ion break through point. This allows water containing Ca ion of suitable concentration to be supplied to the water system with only one cation exchange column and allows the Ca ion concentration in the water system to be held in suitable value, thereby preventing the scale problems and improving the anticorrosive behavior of the water system.

According to the method of the third aspect, the first aspect and the second aspect are combined, thereby further providing well effects.

DESCRIPTION OF THE PREFERRED EMBODIMENTS

Hereinafter, a method of preventing corrosion in a water system of the present invention will be described with reference to the attached drawings.

Figure 1A:
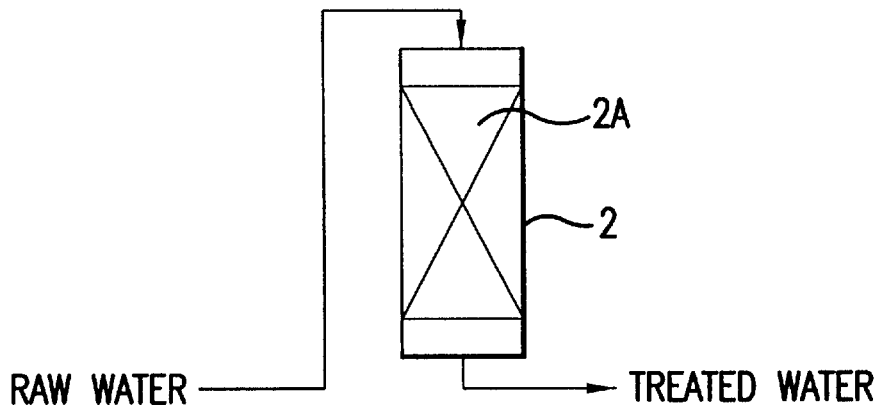
FIGS. 1a, 1b and 1c are schematic diagrams showing an embodiment of a method of preventing corrosion in a water system according to the present invention.
Figure 1B:
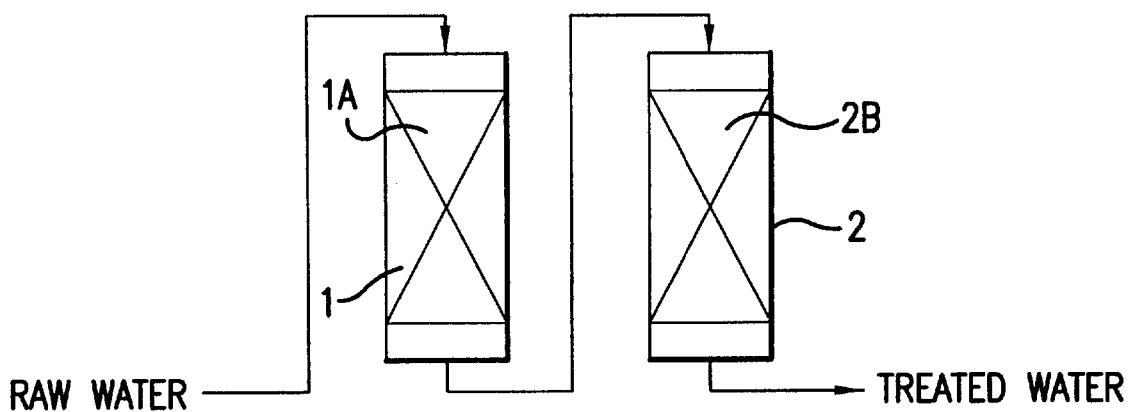
Figure 1C:
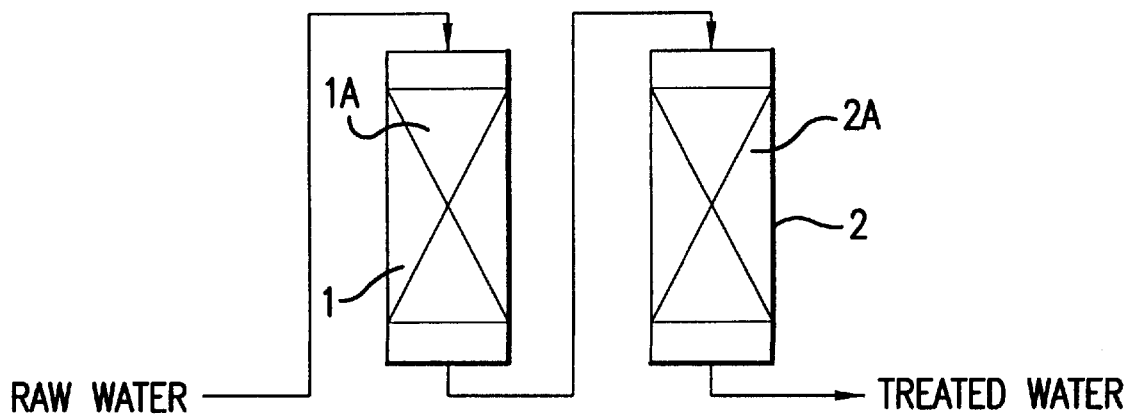

FIGS. 1a, 1b, 1c are schematic diagrams showing an embodiment of the method of preventing corrosion in a water system according to the present invention.

The method of the present invention is a method in which feedwater or holding water (hereinafter, referred to as "raw water") for the water system is treated by ion exchange treatment to remove corrosive ions and partly remove silica and/or Ca ion and then is supplied to the water system. As mentioned above, the Ca ion is removed by using cation exchange resin, the corrosive ions are removed by using the $HCO_3$-form weak basic anion exchange resin or the OH-form strong basic anion exchange resin, and the silica is removed by using the OH-form strong basic anion exchange resin. Accordingly, for example the following ion exchange treatment is performed corresponding to the water quality of the raw water in the present invention.

(i) In case where the silica concentration in the raw water is high and the calcium hardness is low so that it is necessary to remove the silica in part and corrosive ions in the raw water; the raw water is passed only through an anion exchange column 2 filled with the OH-form strong basic anion exchange resin 2A and is then supplied to the water system, as shown in FIG. 1a.

(ii) In case where the silica concentration in the raw water is low and the calcium hardness is high so that it is necessary to remove the Ca ion in part and the corrosive ions in the raw water; the raw water is passed through a cation exchange column 1 filled with a cation exchange resin 1A and an anion exchange column 2 filled with the $HCO_3$-form strong basic anion exchange resin 2B in order and is then supplied to the water system, as shown in FIG. 1b.

(iii) In case where the silica concentration and the calcium hardness in the raw water are both high so that it is necessary to remove the silica, the Ca ion in part and the corrosive ion in the raw water; the raw water is passed through the cation exchange column 1 filled with the cation exchange resin 1A and the anion exchange column 2 filled with the OH-form strong basic anion exchange resin 2A in order and is then supplied to the water system, as shown in FIG. 1c.

It should be noted with regard to the aforementioned treatments (i) through (iii) that "the silica concentration or the calcium hardness is low" means the concentration not allowing the formation of scales in the water system, and "the silica concentration or the calcium hardness is high" means the concentration allowing the formation of scales in the water system. It should be understood that values of the concentration are values given in consideration of number of cycles in case of a water system operating with the concentrated water.

In the present invention, the upper limits of the silica concentration and the calcium hardness of the feedwater to the water system which do not allow the formation of scales are predetermined (hereinafter, the predetermined values are referred to as "silica preset value" or "Ca ion preset value"). In the above ion exchange treatments (ii) and (iii), even after the cation exchange. resin in the cation exchange column reaches the break through point of Ca ion so that the Ca ion flows out, the softening treatment of water in the cation exchange column is continued. The softening treatment is continued when the average value of the calcium hardness of the total amount of water flowing out of the cation exchange column, i.e. the average value of the calcium hardness obtained with regard to the total amount of water flowing out of the cation exchange column from the end of the immediately preceding regeneration to the present time, is less than the Ca ion preset value. Then, when the average value exceeds the Ca ion preset value, the softening treatment of water in the cation exchange column is stopped to regenerate the cation exchange resin.

Also in the above ion exchange treatments (i) and (iii), even after the anion exchange resin in the anion exchange column reaches the break through point of silica so that the silica flows out, the softening treatment of water in the anion exchange column is continued. The softening treatment is continued when the average value of the silica concentration of the total amount of water flowing out of the anion exchange column, i.e. the average value of the silica concentration obtained with regard to the total amount of water flowing out of the anion exchange column from the end of the immediately proceeding regeneration to the present time, is less than the silica preset value. Then, when the average value exceeds the silica preset value, the softening treatment of water in the anion exchange column is stopped to regenerate the anion exchange resin.

In such a manner, the water to be supplied to the water system has a concentration gradient in which the silica concentration and/or the calcium hardness becomes greater with time so that water having the silica concentration or the calcium hardness which may cause scale problems is supplied in the last stage of softening treatment of the water. However, generally, the residence time of the holding water (circulating water) in the cooling water system is relatively long, e.g. 30 through 300 hours, while the normal regeneration cycle (the demineralization period) of the ion exchange resin is a few hours. Consequently, the water having such a concentration gradient supplied to the water system can be considered to be in the sufficiently mixed state. Therefore, according to the method of the present invention, it is safe to say that the average value of the silica concentration or the calcium hardness of the water flowing out of the anion exchange column or the cation exchange column is employed as the reference value.

As mentioned above, in the present invention, with regard to removing silica by the anion exchange resin, water containing little silica (the most are removed by the anion exchange resin) and flowing out of the anion exchange column is supplied to the water system until the anion exchange resin reaches the silica break through point. Even after the anion exchange resin reaches the silica break through point and the water flowing out of the anion exchange column contains silica, the supply of the water to the water system is still continued. The average of the silica concentration of the water from the anion exchange column to the water system is held not in excess of the silica preset value by controlling the amount of flowing water before the silica break through point and the amount of flowing water after the silica break through point, that is, controlling the operating time after the silica break through point. This allows silica to be exist adequately to form a corrosion preventive film, still preventing the scale problems due to scales of a silica group.

In the same manner, with regard to removing Ca ion by the cation exchange resin, water containing little Ca ion (the most are removed by the cation exchange resin) and flowing out of the cation exchange column is supplied to the water system until the cation exchange resin reaches the Ca ion break through point. Even after the cation exchange resin reaches the Ca ion break through point and the water flowing out of the cation exchange column contains Ca ion, the supply of the water to the water system is still continued. The average of the Ca ion concentration of the water from the cation exchange column to the water system is held not in excess of the Ca ion preset value by controlling the amount of flowing water before the Ca ion break through point and the amount of flowing water after the Ca ion break through point, that is, controlling the operating time after the Ca ion break through point. This allows Ca ion to be exist adequately to form a corrosion preventive film, still preventing the scale problems due to scales of a calcium group.

When the average of the silica concentration of the water flowing out of the anion exchange column reaches the silica preset value, the treatment of water in the anion exchange column is stopped and an OH-form strong basic anion exchange resin is regenerated by using alkaline aqueous solution such as about 1–10 weight percent NaOH aqueous solution.

It should be noted that a $HCO_3$-form weak basic anion exchange resin used for removing the corrosive ions is regenerated by using about 1–8 weight percent $NaHCO_3$ aqueous solution.

On the other hand, when the average of the calcium hardness of the water flowing out of the cation exchange column reaches the Ca ion preset value, the softening treatment of water in the cation exchange column is stopped and the cation exchange resin is regenerated by using acid aqueous solution such as about 1–10 weight percent HCl aqueous solution.

Large quantities of regenerants are required to regenerate completely 100% of the ion exchange resin. That is, though the quantity of the used regenerants is substantially proportional to the regeneration rate of the ion exchange resin until 40–60% level of the complete regeneration, the regeneration efficiency becomes significantly poor after this level so that quite large quantities of the regenerants are required.

In the present invention, therefore, it is preferable that the regeneration is finished at the 40–60% level of the complete regeneration where the regeneration efficiency of ion exchange resin is high so as to reduce the amount of the regenerants and the regenerating time.

As is best shown in FIGS. 1b and 1c, where the cation exchange column and the anion exchange column are arranged in series, it is preferable that the respective regeneration levels of the ion exchange resins are controlled in such a manner that the regeneration cycle of the cation exchange column and the regeneration cycle of the anion exchange column are the same.

In the present invention, just the regeneration level and the regeneration cycle of the cation exchange column and/or the anion exchange column are controlled. It is not necessary to arrange two anion exchange columns in parallel and provide bypass piping. Water, containing no corrosive ions and containing silica and Ca ion of suitable concentrations controlled by partly removing silica and/or Ca ion, can be supplied to the water system. Therefore, in preventing the corrosion and the formation of scales in the water system, the miniaturization and simplification of the equipment and the easement in the operation for the regeneration can be realized.

It should be understood that the water flowing out the anion exchange column and/or the cation exchange column may be supplied to the water system once it is received by a tank. The timing for stopping the softening treatment may be determined based on measured values of the silica concentration or the calcium hardness in the water system.

In the present invention, scale inhibitors may be further used. In this case, the scale inhibitors to be employed are not particularly limited and scale inhibitors for scales of a silica group such as partial hydrolysate of polyacrylamide well known in the art may be used. It is preferable that the adding amount of the scale inhibitors is 1–100 mg/l. relative to the amount of holding water in the water system.

If necessary, it is also preferable to use simultaneously anticorrosives such as inorganic phosphate (orthophosphate and polyphosphate), organic phosphoric ester, phosphonic acid, zinc, nickel salt, tungstate, molybdate, nitrite, borate, silicate, hydroxy carboxylic acid, benzotriazole, and mercaptobenzothiazole or, as mentioned above, scale inhibitors such as lignin derivative, tannic acid, and polysaccharide including starch.

As well as the method disclosed in Japanese Unexamined Patent Publication No. H06-158364, a low molecular weight polymer may be added to the water. The low molecular weight polymer facilitate the formation of a uniform film of anticorrosive anions such as $OH^-$, $HCO_3^-$ flowing out in the water by the ion exchange treatment and anticorrosive components such as $Ca^{2+}$, $SiO_2$ arising from the water system, thereby further reliably preventing the corrosion.

In this case, as the low molecular weight polymer may be a water soluble polymer having 500–100,000, preferably, 1,000–20,000. Such a water soluble polymer includes a copolymer of maleic acid and isobutylene, polyacrylic acid, partial hydrolysate of polyacrylamide, a copolymer of acrylic acid and allyloxy-2-hydroxypropanesulfonic acid, a copolymer of acrylic acid and hydroxyethylmethacrylic acid, a copolymer of acrylamide and arylsulfonic acid, a copolymer of acrylic acid and maleic acid, a copolymer of acrylic acid and styrene, a copolymer of acrylic acid and styrenesulfonic acid, polymaleic acid, polystyrenesulfonic acid, a copolymer of acrylic acid and itaconic acid, polyitaconic acid, a copolymer of acrylic acid and acrylonitrile, a copolymer of acrylic acid and vinylsulfonic acid, and a copolymer of methyl vinyl ether and maleic acid which are known in the prior art.

Though the amount of such a low molecular weight polymer may vary corresponding to the quality of raw water, it is preferably 0.1–500 mg/l. relative to the holding water.

Though the timing of adding the low molecular weight polymer is not particularly limited, the low molecular weight polymer is normally preferably added after the treatment by the anion exchange resin.

The method of the present invention as mentioned above is effective in preventing corrosion in a water system containing $Cl^-$, $So_4^{2-}$ as corrosive ions, and silica and/or Ca ion, such as a fresh water system, where water is concentrated.

EXAMPLES

Hereinafter, the present invention will be concretely described with reference to examples and comparative examples.

The qualities of raw water A, B, C used in the examples and comparative examples are shown in the following table 1.

TABLE 1

| Raw water | pH | M-alkalinity (mg/L) | total hardness (mg L) | calcium hardness (mg/L) | Silica (mg/L) | $Cl^-$ ion (mg/L) | $SO_4^{2-}$ ion (mg/L) |
|---|---|---|---|---|---|---|---|
| A | 7.2 | 53 | 61 | 41 | 30 | 29 | 25 |
| B | 7.8 | 56 | 67 | 37 | 7 | 47 | 20 |
| C | 7.6 | 64 | 31 | 19 | 76 | 5 | 4 |

Example 1

Figure 2:
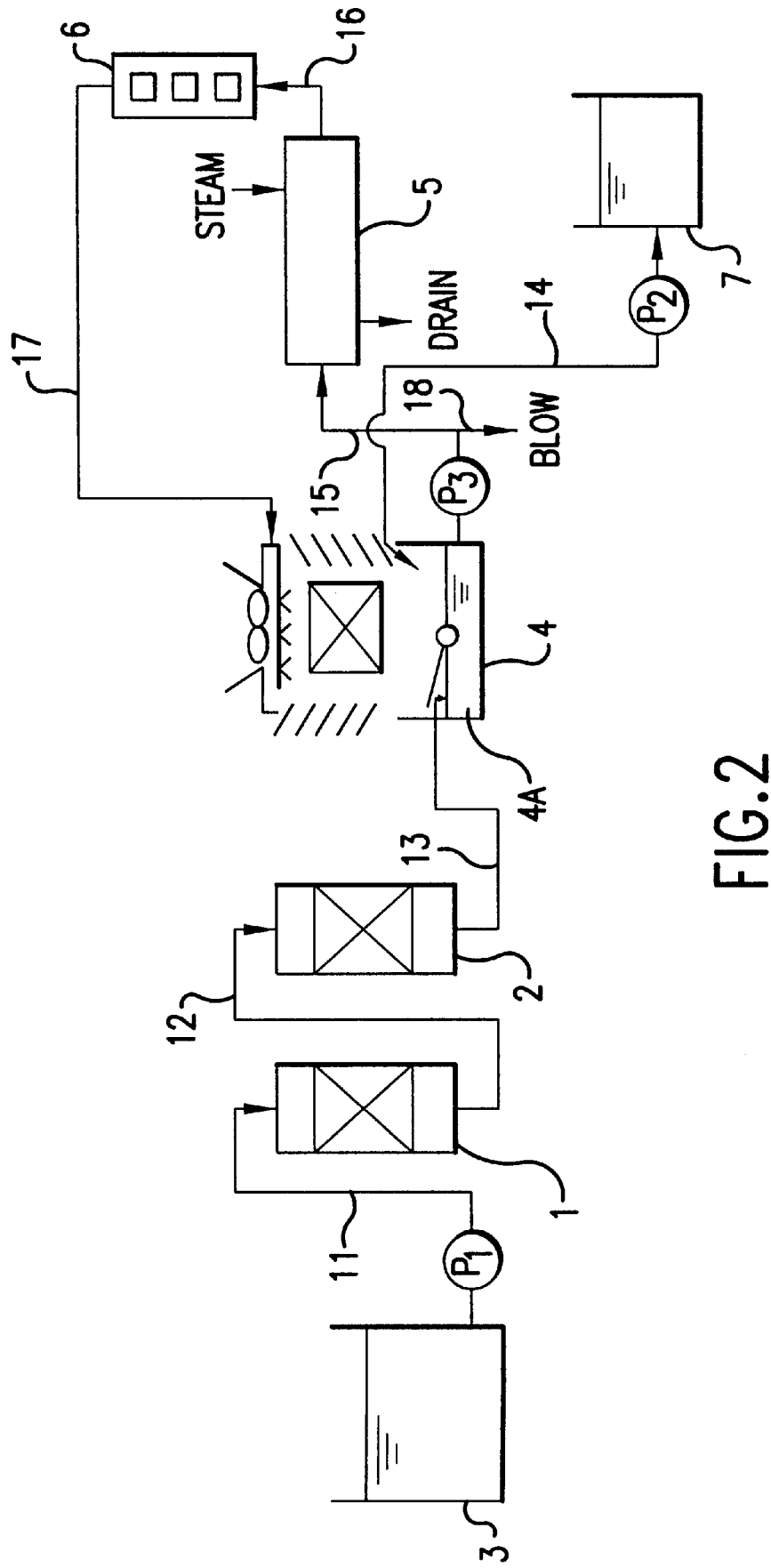
FIG. 2 is a schematic diagram showing a pilot test equipment used in examples 1–3.
Figure 3A:
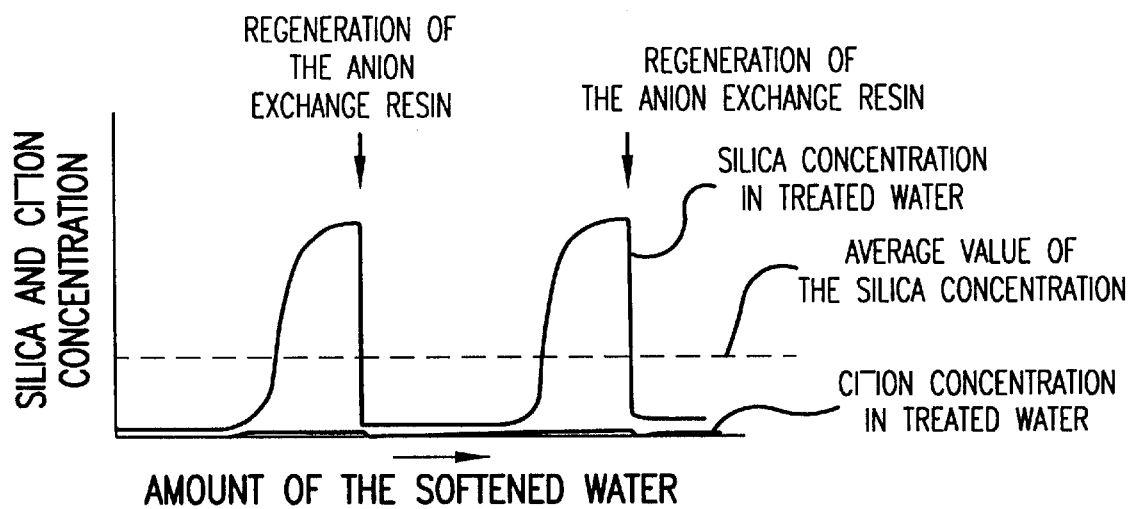
FIG. 3a is a graph showing the relation between the amount of softened water of an anion exchange column and the silica and Cl$^-$ ion concentration in treated water.
Figure 3B:
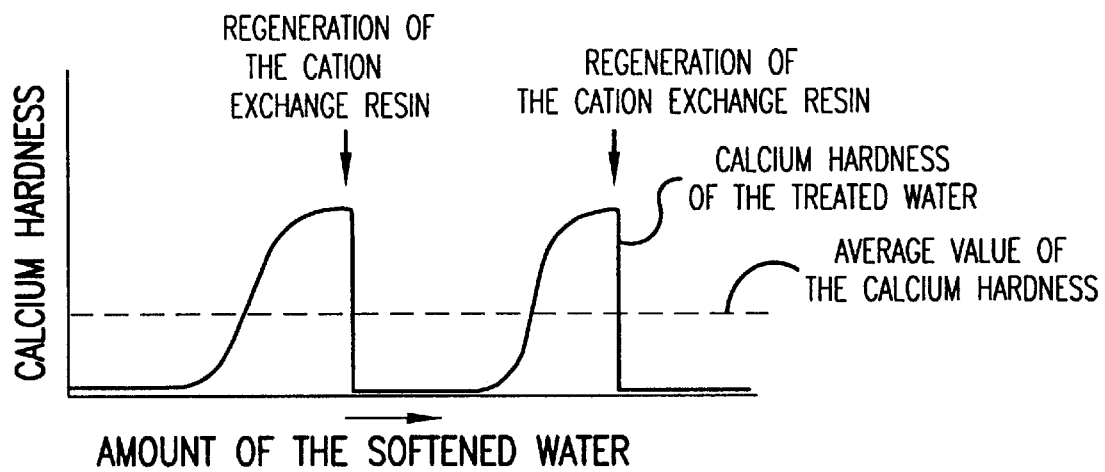
FIG. 3b is a graph showing the relation between the amount of the softened water of the cation exchange column and the calcium hardness of the treated water.
Figure 4:
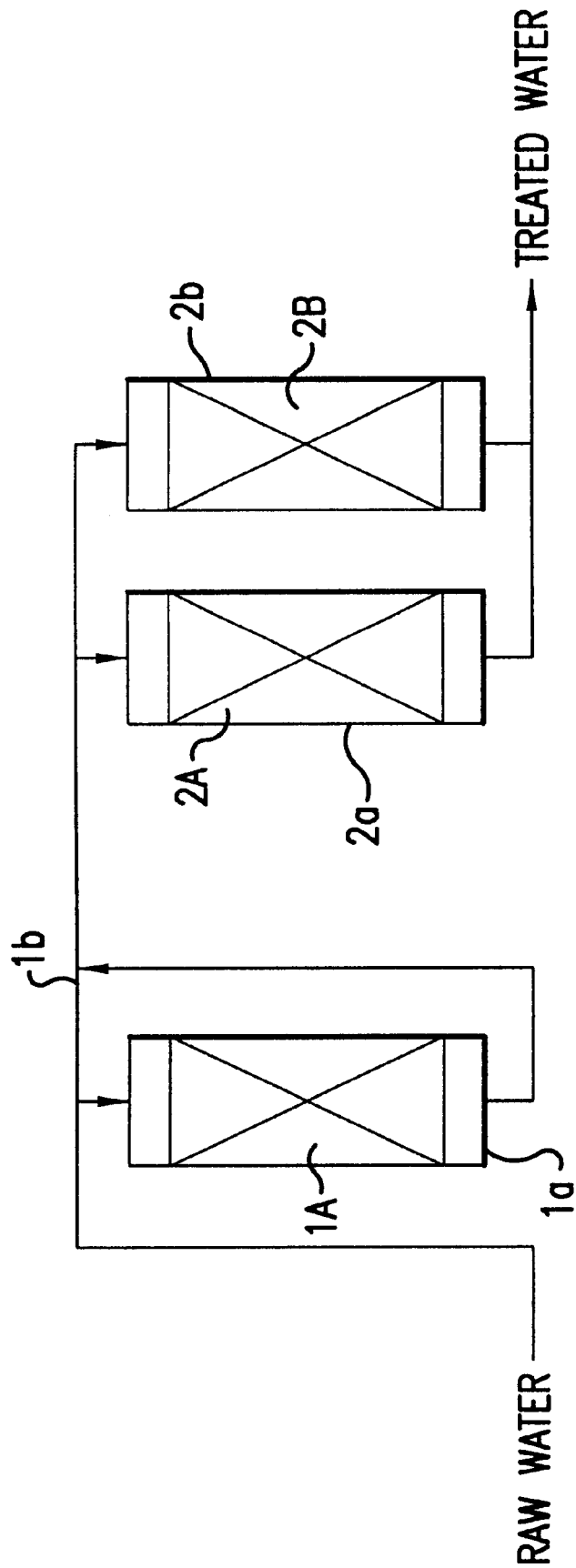
FIG. 4 is a schematic diagram showing a conventional method.

The scale preventive effect and the corrosive preventive effect have been tested by using pilot test equipment shown in FIG. 2.

In FIG. 2, the numeral 1 designates a cation exchange column, 2 designates an anion exchange column, 3 designates a raw water tank, 4 designates a cooling tower, 5 designates a heat exchanger, 6 designates a test piece column, and 7 designates a scale inhibitor tank.

The raw water was supplied to a holding water tank 4A of the cooling tower 4 through a line 11, the cation exchange column 1, a line 12, the anion exchange column 2, and a line 13, by a pump $P_1$. Scale inhibitor in the scale inhibitor tank 7 was added into the holding water tank 4A through a line 14 by a pump $P_2$. The cooling water was circulated from and to the water tank 4A through a line 15, the heat exchanger 5, a line 16, the test piece column 6, and a line 17 by a pump $P_3$. The circulating water was partly blown out of the water system through a line 18.

The cation exchange column 1 was filled with 500 ml of the cation exchange resin and the anion exchange column 2 was filled with 500 ml of the anion exchange resin. Two commercial carbon steel tubes (STB340, the outer diameter of 19 mm, the thickness of 2.2 mm (actual measurement)) were used as heat exchange tubes of the heat exchanger 5. The test piece was a carbon steel test piece (SPCC, 30 mm×50 mm×1 mm). The scale inhibitor was polymaleic acid.

The cooling water system operates in the following condition:
Feed water quantity: 22 lit/hr,
Holding water quantity: 300 liters,
Circulating water quantity: 10.6 lit/hr,
Blowing water quantity: 3 lit/hr,
Temperature of circulating water at heat exchanger inlet: 30° C.,
Temperature of circulating water at heat exchanger outlet: 50° C.,
Scale inhibitor amount to be added: 15 mg/l., and
Number of cycles: 7 times.

The raw water A shown in Table 1 was used as the raw water for this example. In feeding the raw water, the cation exchange resin in the cation exchange column 1 was regenerated with 5 weight percent HCl aqueous solution to a regeneration level: 17 g—HCl/l.—resin (15% of the complete regeneration) and the anion exchange resin in the anion exchange column 2 was regenerated with 5 weight percent NaOH aqueous solution to a regeneration level: 50 g—NaOH/l.—resin (38% of the complete regeneration). he feeding water was continued with the feeding water quantity of 260 liters and he regeneration being conducted under the above same condition for every 12 hours of the feeding time.

While the cation exchange resin in the cation exchange column reached the Ca ion break through point after 6 hours operation, the average of the calcium hardness of the water flowing out of the cation exchange column which was obtained by 12 hour water flowing was 21 mg/l. While the anion exchange resin in the anion exchange column reached the silica break through point after 4 hours operation, the average of the silica concentration of the water flowing out of the anion exchange column which was obtained by 12-hour water feeding was 21 mg/l. Since the averages of the calcium hardness and the silica concentration after the 12 hours water feeding did not reach the concentration causing scale problems, the softening treatment were continued after the cation exchange resin and the anion exchange resin reached the respective break through points.

The average quality of the feedwater and the rate of corrosion and the rate of scaling of the test pieces after 30-day operation were measured and the results were shown in Table 2.

Example 2

The raw water B shown in Table 1 was used as the raw water for this example. In feeding the raw water, the cation exchange resin in the cation exchange column 1 was regenerated with 5 weight percent HCl aqueous solution to a regeneration level: 50 g—HCl/l.—resin (53% of the complete regeneration) and the anion exchange resin in the anion exchange column 2 was regenerated with 5 weight percent $NaHCO_3$ aqueous solution to a regeneration level: 80 g-$NaHCO_3$/l.—resin (31% of the complete regeneration). The operation of this example was the same as Example 1, except that the feeding water was continued with the feeding water quantity of 940 liters and the regeneration being conducted under the above same condition for every 43 hours of the feeding time. The average quality of the feedwater and the rate of corrosion and the rate of scaling of the test pieces were measured and the results were shown in Table 2.

In this example, while the cation exchange resin in the cation exchange column reached the Ca ion break through point after 18 hours operation, the average of the calcium hardness of the water flowing out of the cation exchange column which was obtained by 43-hour water flowing was 21 mg/l. The anion exchange resin in the anion exchange column did not have the function of ion exchange of silica so that the average of the silica concentration of the water flowing out of the anion exchange column which was obtained by 43-hour water feeding was the same as the raw water B, i.e. 7 mg/l.

Example 3

The raw water C shown in Table 1 was used as the raw water for this example and there was only the anion exchange column without the cation exchange column in this example. In feeding the raw water, the anion exchange resin in the anion exchange column was regenerated with 5 weight percent NaOH aqueous solution to the same regeneration level as that in Example 1. The operation was the same as Example 1 except that the feeding water quantity was 270 liters and the regeneration was conducted under the above same condition for every 12 hours of the feeding time. The average quality of the feedwater and the rate of corrosion and the rate of scaling of the test pieces were measured and the results were shown in Table 2.

In this example, while the anion exchange resin in the anion exchange column reached the silica break through point after 4 hours operation, the average of the silica concentration of the water flowing out of the anion exchange column which was obtained by 12-hour water flowing was 50 mg/l.

Comparative Examples 1 through 3

The comparative examples were conducted in the same manner as Examples 1, 2, 3 except that the raw water A, B, C were directly supplied to the cooling water system without the ion exchange treatment. The average quality of the feedwater (same as the raw water) and the rate of corrosion and the rate of scaling of the test pieces were measured and the results were shown in Table 2.

TABLE 2

| Example | raw water | ion exchange treatment | mean concentration of make-up water of cooling water system | | | | | | | result | |
|---|---|---|---|---|---|---|---|---|---|---|---|
| | | | pH | M-alkalinity (mg/L) | total hardness (mg/L) | calcium hardness (mg/L) | silica (mg/L) | $Cl^-$ ion (mg/L) | $SO_2^{2-}$ ion (mg/L) | corrosion rate (mdd) | scaling rate (mg/cm$^2$/month) |
| Example 1 | A | conducted | 7.4 | 73 | 31 | 21 | 21 | <1 | <1 | 3 | 9 |
| Comparative example 1 | | not conducted | 7.2 | 53 | 61 | 41 | 30 | 29 | 25 | 9 | 25 |
| Example 2 | B | conducted | 7.8 | 79 | 39 | 21 | 7 | <1 | <1 | 2 | 6 |
| Comparative example 2 | | not conducted | 7.8 | 56 | 67 | 37 | 7 | 47 | 20 | 25 | 44 |
| Example 3 | C | conducted | 7.6 | 75 | 30 | 20 | 50 | <1 | <1 | 5 | 7 |
| Comparative example 3 | | not conducted | 7.6 | 64 | 31 | 19 | 76 | 5 | 4 | 8 | 37 |

It is apparent from Table 2 that, according to the method of the present invention, the corrosion in the water system can be restricted and the scale problems can also be prevented.

As described above, according to the method of preventing corrosion in the water system of the present invention, feedwater or holding water for the water system is treated by ion exchange treatment to remove corrosive ions, thereby reducing the corrosiveness of the water system, and remove silica and/or Ca ion to control the silica and/or Ca ion concentrations in the water system to be in suitable values, thereby preventing the scale problems and improving the anticorrosive behavior of the water system. By using such a method of the present invention, the miniaturization of the equipment for the ion exchange treatment, the easement in the operation for the regeneration, and the reduction in the amount of agent and the displacement can be realized.

What is claimed is:

1. A method of preventing corrosion in a water system comprising, contacting water to be supplied to the water system or water drawn from the water system with an OH-form strong basic anion exchange resin to remove corrosive ions and then supplying the water to the water system,
   wherein the water brought in contact with the anion exchange resin is continued to be supplied into the water system after the anion exchange resin reaches a silica break through point where the anion exchange resin exceeds an ion exchange capacity for removing silica from said water, to allow silica to flow out to the water system, said water being supplied until the silica concentration of the water reaches a predetermined value so that the silica exists in the water system in an amount not forming a scale based on the silica break through point to thereby form a corrosion preventive film by silica in the water system.

2. A method as claimed in claim 1, wherein said predetermined value is set in a range where the scale is not substantially generated in the water system.

3. A method as claimed in claim 1, wherein a scale inhibitor is added in the water.

4. A method as claimed in claim 1, wherein a polymer with molecular weight less than 100,000 is added in the water.

5. A method as claimed in claim 1, wherein said predetermined value of the silica concentration is an average silica concentration contained in the water where the silica in the water does not substantially form the scale in the water system.

6. A method as claimed in claim 5, wherein when the silica concentration in the water reaches the predetermined value, the contact of the water by the anion exchange resin is stopped and the anion exchange resin is regenerated.

7. A method of preventing corrosion in a water system comprising, contacting water to be supplied to the water system or water drawn from the water system with a cation exchange resin and then with an anion exchange resin to remove corrosive ions and, after that, supplying the water to the water system,
   wherein the water brought in contact with the cation exchange resin is continued to be brought in contact with the anion exchange resin after the cation exchange resin reaches a Ca ion break through point where the cation exchange resin exceeds an ion exchange capacity for removing calcium ions from said water, to allow Ca ions to flow out to the water system, said water being supplied until the Ca ion concentration of the water reaches a predetermined value so that the Ca ions exist in the water system in an amount not forming a scale based on the Ca ion break through point to thereby form a corrosion preventive film in the water system.

8. A method as claimed in claim 7, wherein said predetermined value is set in a range where the scale is not substantially generated in the water system.

9. A method as claimed in claim 7, wherein a scale inhibitor is added in the water.

10. A method as claimed in claim 7, wherein a polymer with molecular weight less than 100,000 is added in the water.

11. A method as claimed in claim 7, wherein said predetermined value of the Ca ion concentration is an average Ca hardness contained in the water where the Ca ions in the water do not substantially form the scale in the water system.

12. A method as claimed in claim 11, wherein when the Ca ion concentration in the water reaches the predetermined value, the contact of the water by the cation exchange is stopped and the cation exchange resin is regenerated.

13. A method of preventing corrosion in a water system comprising, contacting water to be supplied to the water system or water drawn from the water system with a cation exchange resin and then with an OH-form strong basic anion exchange resin to remove corrosive ions, and after that, supplying the water to the water system, wherein the water brought in contact with the anion exchange resin is continued to be supplied into the water system after said anion exchange resin reaches a silica break through point where the anion exchange resin exceeds an ion exchange capacity for removing silica from said water, to allow silica to flow out to the water system, said water being supplied until the silica concentration of the water reaches a predetermined value so that the silica exists in the water system in an amount not forming a scale based on the silica break through point, and the water brought in contact with the cation exchange resin is continued to be brought in contact with the anion exchange resin after said cation exchange resin reaches a Ca ion break through point where the cation exchange resin exceeds an ion exchange capacity for removing calcium ions from said water, to allow Ca ions to flow out to the water system, said water being supplied until the Ca ion concentration of the water reaches a predetermined value so that the Ca ions exist in the water system in an amount not forming a scale based on the Ca ion break through point to thereby form a corrosion preventive film in the water system by at least one of the Ca ions and silica.

14. A method as claimed in claim 13, wherein said predetermined value is set in a range where the scale is not substantially generated in the water system.

15. A method as claimed in claim 13, wherein a scale inhibitor is added in the water.

16. A method as claimed in claim 13, wherein a polymer with molecular weight less than 100,000 is added in the water.

17. A method as claimed in claim 13, wherein said predetermined value of the silica concentration is an average silica concentration contained in the water where the silica in the water does not substantially form the scale in the water system, and said predetermined value of the Ca ion concentration is an average Ca hardness contained in the water where the Ca ions in the water do not substantially form the scale in the water system.

18. A method as claimed in claim 17, wherein when the silica concentration in the water reaches the predetermined value, the contact of the water by the anion exchange resin is stopped and the anion exchange resin is regenerated, and when the Ca ion concentration in the water reaches the predetermined value, the contact of the water by the cation exchange is stopped and the cation exchange resin is regenerated.

* * * * *